United States Patent
Hickey et al.

(10) Patent No.: US 9,809,055 B2
(45) Date of Patent: Nov. 7, 2017

(54) WHEEL LOCKING ASSEMBLY AND METHOD

(71) Applicant: FORD GLOBAL TECHNOLOGIES, LLC, Dearborn, MI (US)

(72) Inventors: Joseph Prescott Hickey, Canton, MI (US); Jordan Mazaira, Dearborn Heights, MI (US); Ka Wai Kevin So Zhao, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/041,143

(22) Filed: Feb. 11, 2016

(65) Prior Publication Data
US 2017/0232786 A1 Aug. 17, 2017

(51) Int. Cl.
*B60B 7/16* (2006.01)
*E05B 73/00* (2006.01)
*E05B 63/00* (2006.01)
*B60B 7/00* (2006.01)

(52) U.S. Cl.
CPC ............ *B60B 7/16* (2013.01); *E05B 63/0052* (2013.01); *E05B 73/00* (2013.01); *B60B 7/0013* (2013.01); *B60B 2900/3318* (2013.01)

(58) Field of Classification Search
CPC ............. Y10T 70/5889; Y10T 70/5987; Y10T 70/8649; Y10T 70/558; Y10T 70/5836; Y10T 70/5854; Y10T 70/5858; B60B 7/16; B60B 7/0013; B60B 2900/3318; E05B 63/0052; E05B 73/00

USPC ......... 70/225, 423, 424, 427, 428, 163, 370, 70/371, 379 R
See application file for complete search history.

(56) References Cited

U.S. PATENT DOCUMENTS

| | | | | |
|---|---|---|---|---|
| 1,929,679 A | * | 10/1933 | Duncan | B60R 25/00 224/42.24 |
| 1,931,080 A | * | 10/1933 | Nehls | B62D 43/007 224/42.24 |
| 2,124,035 A | * | 7/1938 | Hurd | B60B 23/06 292/6 |
| 2,303,594 A | * | 12/1942 | Wise | B60K 15/0409 220/210 |

(Continued)

FOREIGN PATENT DOCUMENTS

| CN | 2284701 Y | 6/1998 |
|---|---|---|
| CN | 201525237 U | 7/2010 |

(Continued)

OTHER PUBLICATIONS

English Machine Translation of CN201525237U.
(Continued)

*Primary Examiner* — Suzanne Barrett
(74) *Attorney, Agent, or Firm* — Raymond Coppiellie; King & Schickli, PLLC

(57) ABSTRACT

A wheel locking assembly is provided for securing a wheel to a wheel hub of a motor vehicle. That wheel locking assembly includes a locking cylinder and a wheel retainer. The wheel retainer is displaceable by means of the locking cylinder between an unlocked position, allowing removal of the wheel from the wheel hub and a locked position securing the wheel to the wheel hub. A related method for securing a wheel to a wheel hub of a motor vehicle is also disclosed.

11 Claims, 6 Drawing Sheets

(56) References Cited

U.S. PATENT DOCUMENTS

| | | | | |
|---|---|---|---|---|
| 2,807,157 A | * | 9/1957 | McLin | B60B 7/16 |
| | | | | 292/25 |
| 3,833,266 A | * | 9/1974 | Lamme | B60B 7/16 |
| | | | | 301/37.21 |
| 4,551,998 A | * | 11/1985 | Ricouard | E05B 65/5269 |
| | | | | 292/210 |
| 5,301,527 A | | 4/1994 | Pollard | |

FOREIGN PATENT DOCUMENTS

| | | |
|---|---|---|
| CN | 203485664 U | 3/2014 |
| DE | 2852817 A1 | 5/1980 |

OTHER PUBLICATIONS

English Machine Translation of CN203485664U.
English Machine Translation of CN2284701Y.
English Machine Translation of DE2852817A1.

* cited by examiner

WHEEL LOCKING ASSEMBLY AND METHOD

TECHNICAL FIELD

This document relates generally to the motor vehicle equipment field and, more particularly, to a wheel locking system and method for securing a wheel to a wheel hub of a motor vehicle.

BACKGROUND

Wheel theft is a common issue which can be a very costly inconvenience. The potential impact of wheel theft includes damage to brake rotors and undercarriage components, being stranded without the benefit of an operating vehicle and the cost associated with purchasing new wheels and tires.

In the past, it has been sought to deter wheel theft using methods that focus on the provision of one or more locking lug nuts which require a special socket "key" to remove. It should be appreciated, however, that such locking lug nuts only serve as a minor deterrent to theft. These specially shaped lug nuts may be removed without the key using different methods ranging from a smaller socket and a mallet to an off-the-shelf lock nut removal tool. Further, in most cases the locking lug nut looks different than the rest of the lug nuts and is often aesthetically displeasing.

As an alternative to a locking lug nut, a locking hub cap has also been provided to cover the lug nuts. Such locking hub caps obscure access to the lug nuts in order to prevent removal. As a result, such locking hub caps limit style choices for the exterior of the wheel and are often not an aesthetically pleasing solution.

This document relates to a new and improved wheel locking system effectively securing a wheel to a wheel hub of a motor vehicle while allowing for a greater range of design options and a far more aesthetically pleasing appearance. As a result, this wheel locking system represents a significant advance in the art.

SUMMARY

In accordance with the purposes and benefits described herein, a wheel locking assembly is provided for securing a wheel to a wheel hub of a motor vehicle. That wheel locking assembly comprises a locking cylinder and a wheel retainer. The wheel retainer is displaced by the locking cylinder between an unlocked position, allowing removal of the wheel from the wheel hub, and a locked position securing the wheel to the wheel hub.

The wheel locking assembly may further include a dust cap for covering the locking cylinder. Further, the wheel locking assembly may include a protective shroud that is concentrically received around the locking cylinder in order to protect against pry bar attacks by providing added security.

The wheel locking assembly may also include a rotary cam that is connected to the locking cylinder and engages the wheel retainer. Still further, the wheel locking assembly may include a wheel bearing plate that is concentrically received around the locking cylinder between the protective shroud and the rotary cam.

The wheel retainer may include a plurality of radially arrayed spring legs. In such an embodiment, the wheel bearing plate may include a plurality of apertures and the plurality of radially arrayed spring legs project through those plurality of apertures.

Still further, the wheel locking assembly may further include a spacer that is concentrically received over the locking cylinder between the wheel bearing plate and the rotary cam.

In accordance with an additional aspect, a method of securing a wheel to a wheel hub of a motor vehicle is provided. That method comprises the steps of (a) seating the wheel on the wheel hub, (b) positioning a wheel locking assembly over the wheel and (c) deploying a wheel retainer of the wheel locking assembly into a wheel locking position in engagement with a locking channel on the wheel hub.

That method may further include the step of turning a key to deploy the wheel retainer and secure the wheel to the wheel hub. Further the method may include the step of turning a rotary cam to deploy the wheel retainer into the wheel locking position.

Still further, the method may include the step of providing the wheel retainer with a plurality of radially projecting legs that engage in a continuous channel of the wheel hub when deployed into the wheel locking position. Further, the method may include the step of extending the plurality of radially projecting legs through apertures provided in a wheel bearing plate carried on the wheel locking assembly.

In accordance with still another aspect, a method is provided for securing a wheel to a wheel hub of a motor vehicle wherein that method comprises the steps of: seating the wheel on the wheel hub and inserting a vehicle ignition/door key into the wheel locking assembly and deploying a wheel retainer of the wheel locking assembly into a wheel locking position.

That method may further include the step of engaging the wheel retainer with a locking channel on the wheel hub. Further the method may include the step of turning a rotary cam to deploy the wheel retainer into the wheel locking position.

In the following description, there are shown and described several preferred embodiments of the wheel locking assembly and the related wheel locking method. As it should be realized, the assembly and method are capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the wheel locking assembly and method and together with the description serve to explain certain principles thereof. In the drawing figures.

Reference will now be made in detail to the present preferred embodiments of the wheel locking assembly, examples of which are illustrated in the accompanying drawing figures.

DETAILED DESCRIPTION

Figure 1:
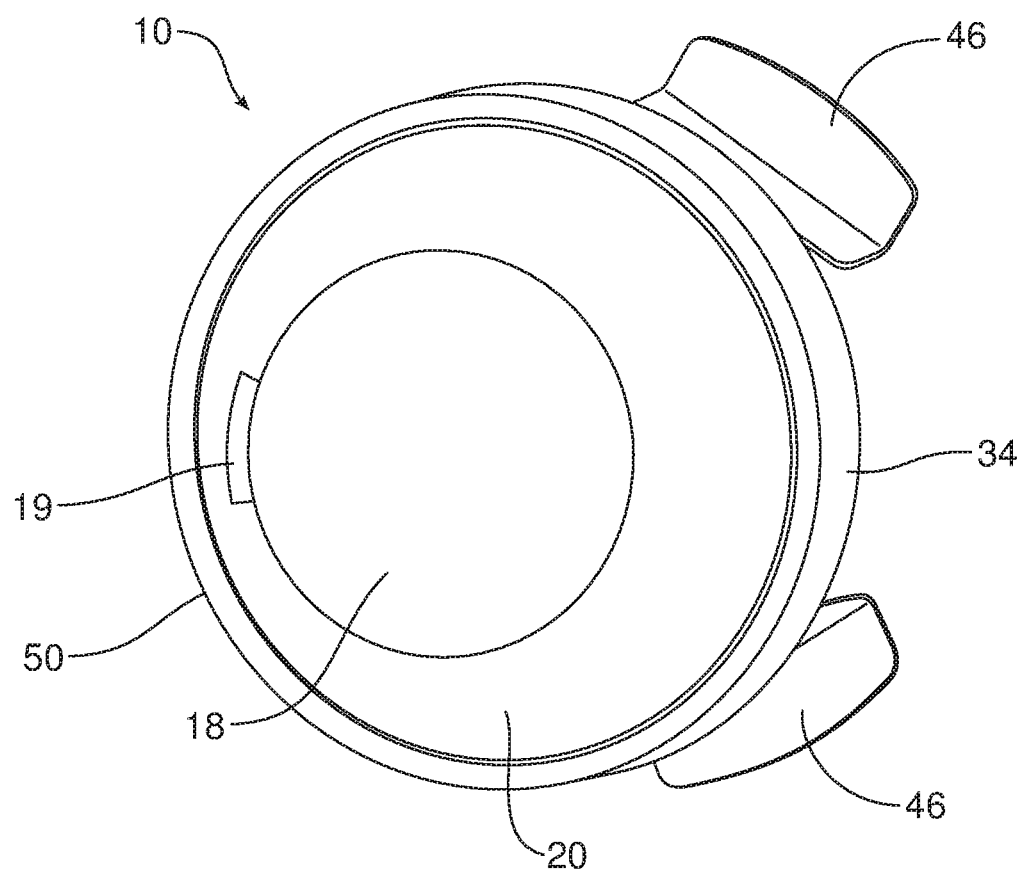
FIG. 1 is a front perspective view of the wheel locking assembly.
Figure 2:
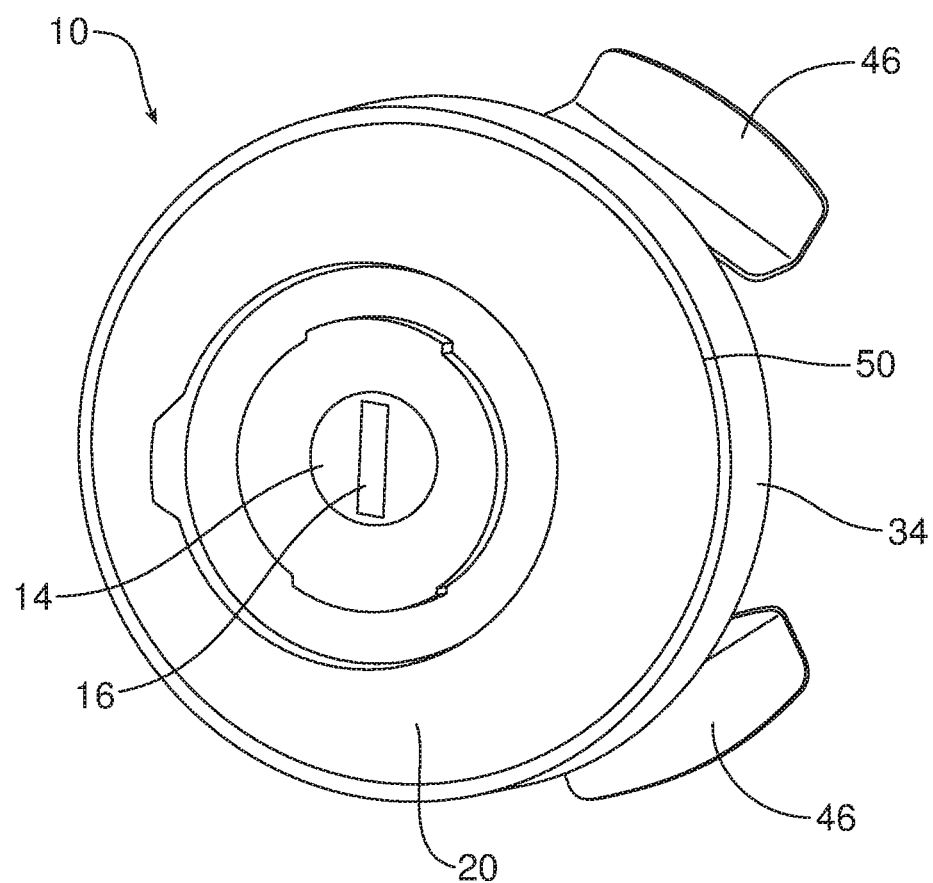
FIG. 2 is a similar view of the wheel locking assembly of FIG. 1 with the dust cap removed to expose the key slot of the locking cylinder.
Figure 3:
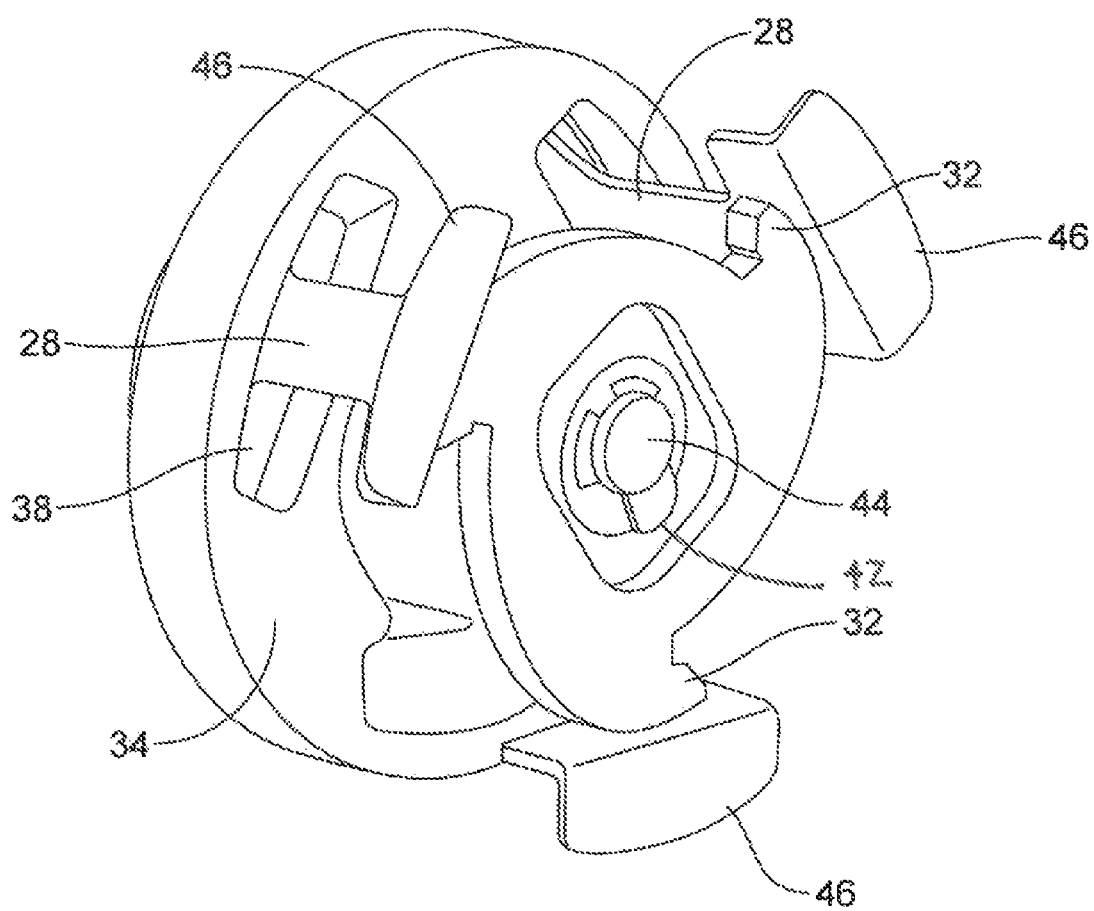
FIG. 3 is a rear perspective view of the wheel locking assembly clearly illustrating the wheel retainer and rotary cam thereof.
Figure 4:
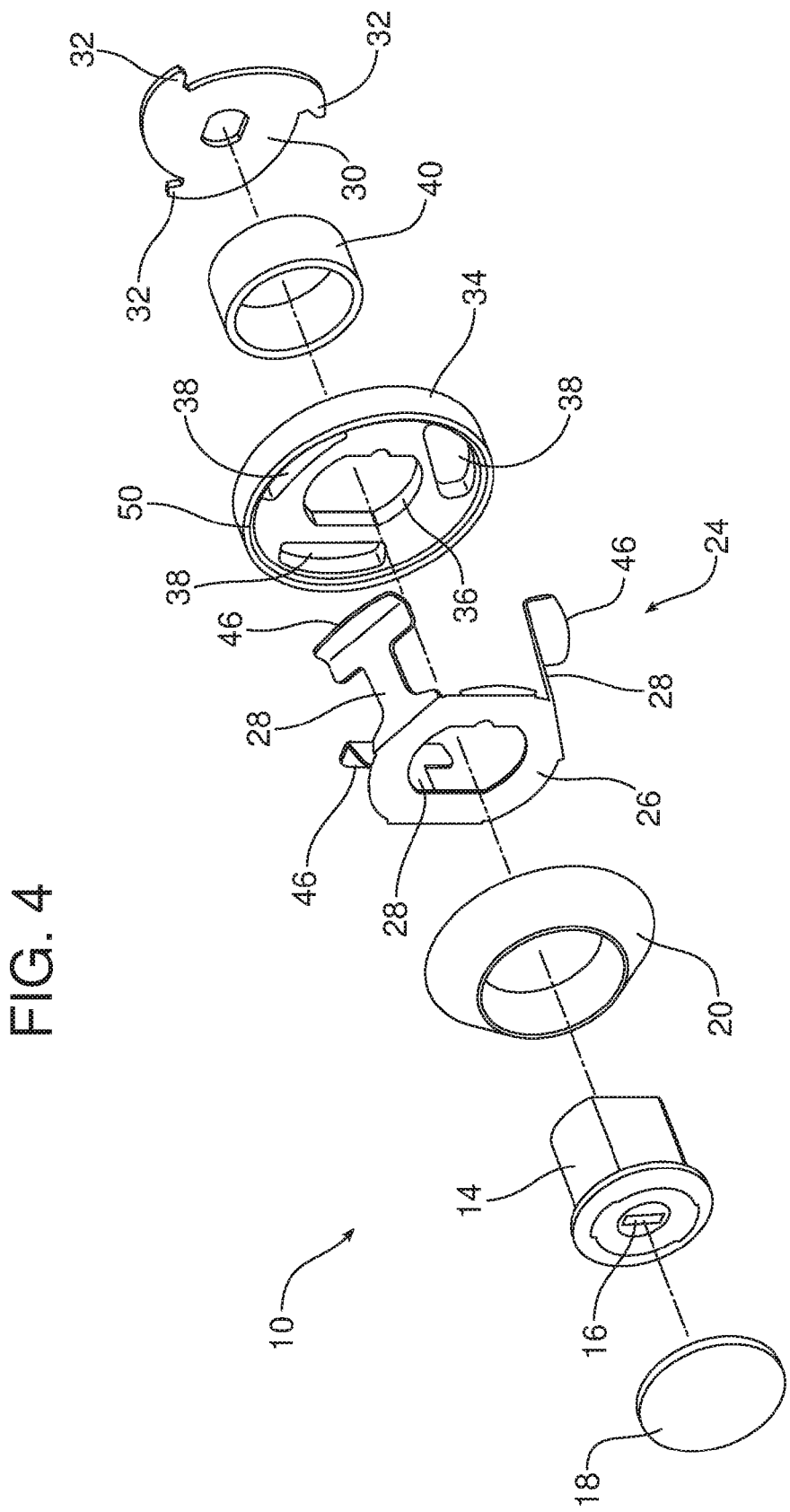
FIG. 4 is an exploded perspective view of the wheel locking assembly clearly illustrating the dust cap, locking cylinder, protective shroud, wheel retainer, wheel bearing plate, spacer and rotary cam of the device.

Reference is now made to FIGS. 1-6, which clearly illustrate the wheel locking assembly 10 that is inserted into the center part of the wheel W normally reserved for a decorative cap. As best illustrated in FIGS. 1, 2 and 4, the wheel locking assembly 10 includes a locking cylinder 14. The locking cylinder 14 may comprise an electronic locking cylinder that is unlocked with a remote, a key fob or an actuator inside the motor vehicle. An electronic locking cylinder 14 would allow for a wide range of wireless and connected authentication options to allow for unlocking. Alternatively, the locking cylinder 14 could be a key locking cylinder including a key slot 16 for receiving a key such as the ignition key or door key of the motor vehicle to which the wheel W is to be connected. The wheel locking assembly 10 also includes a decorative dust cap 18 and a protective shroud 20. As illustrated, the protective shroud 20 is concentrically received over the locking cylinder 14. The dust cap 18 snaps into the opening. When properly seated, the dust cap 18 seals the key slot 16 of the locking cylinder 14 (compare FIGS. 1 and 2). The dust cap 18 may be easily removed to gain access to the underlying key slot 16 by inserting a prying tool, such as the key or a screwdriver, into the notch 19.

As further illustrated in FIGS. 1-4, the wheel locking assembly 10 also includes a wheel retainer 24. In the illustrated embodiment, the wheel retainer 24 comprises a base ring 26 with a plurality of radially arrayed spring legs 28. The wheel retainer 24 may be made from spring steel or other appropriate material.

The wheel locking assembly 10 also includes a rotary cam 30. The number of lugs 32 on the rotary cam 30 corresponds to the number of spring legs 28 provided on the wheel retainer 24. In the illustrated embodiment, there are three spring legs 28 and three lugs 32. The function of the rotary cam 30 will be described in greater detail below.

The wheel locking assembly 10 also includes a wheel bearing plate 34 that is concentrically received around the locking cylinder 14 and is provided between the protective shroud 20 and the rotary cam 30. As should be appreciated, the locking cylinder 14 has an acircular body and the wheel bearing plate 34 includes a complementary acircular opening 36 that prevents relative rotation between the locking cylinder and the wheel bearing plate.

The wheel bearing plate 34 also includes three additional radially arrayed apertures 38. When assembled, the spring legs 28 of the wheel retainer 24 extend through these apertures 38. In operation, the wheel bearing plate 34 distributes the load from the spring legs 28 of the wheel retainer 24 to the wheel hub H (see FIG. 5). More specifically, the spring legs 28 pass through the apertures 38 creating a direct load path from the wheel W to the wheel hub H.

As further illustrated in FIGS. 3 and 4, the wheel locking assembly 10 also includes a spacer 40 that is concentrically received over the locking cylinder 14 between the wheel bearing plate 34 and the rotary cam 30. A snap ring 42 engages a cooperating locking tab 44 at the rear of the locking cylinder 14 to hold the wheel locking assembly 10 together.

Figure 5:
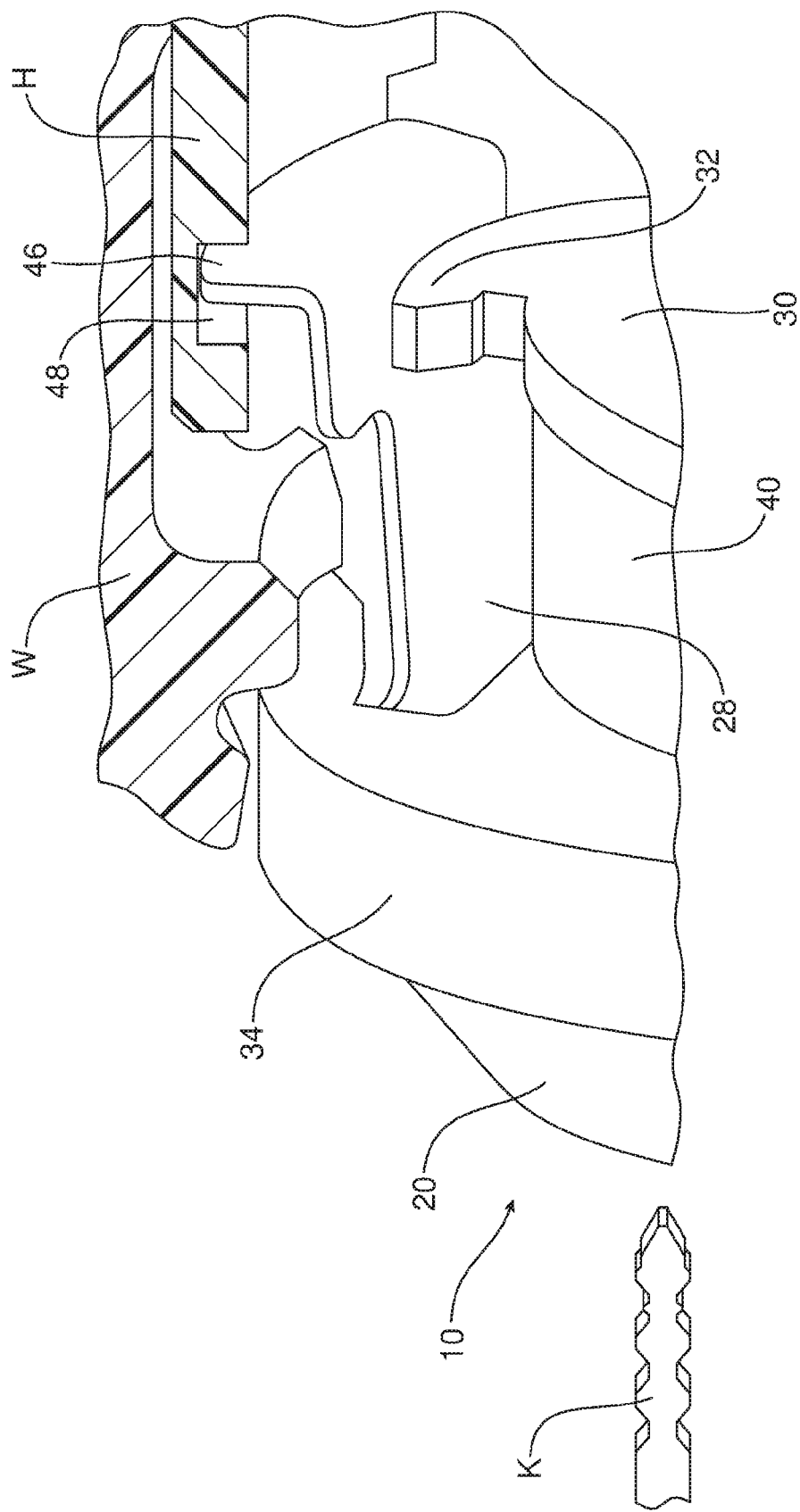
FIG. 5 is a detailed sectional view illustrating the wheel retainer in a locked position securing the wheel to the wheel hub.
Figure 6:
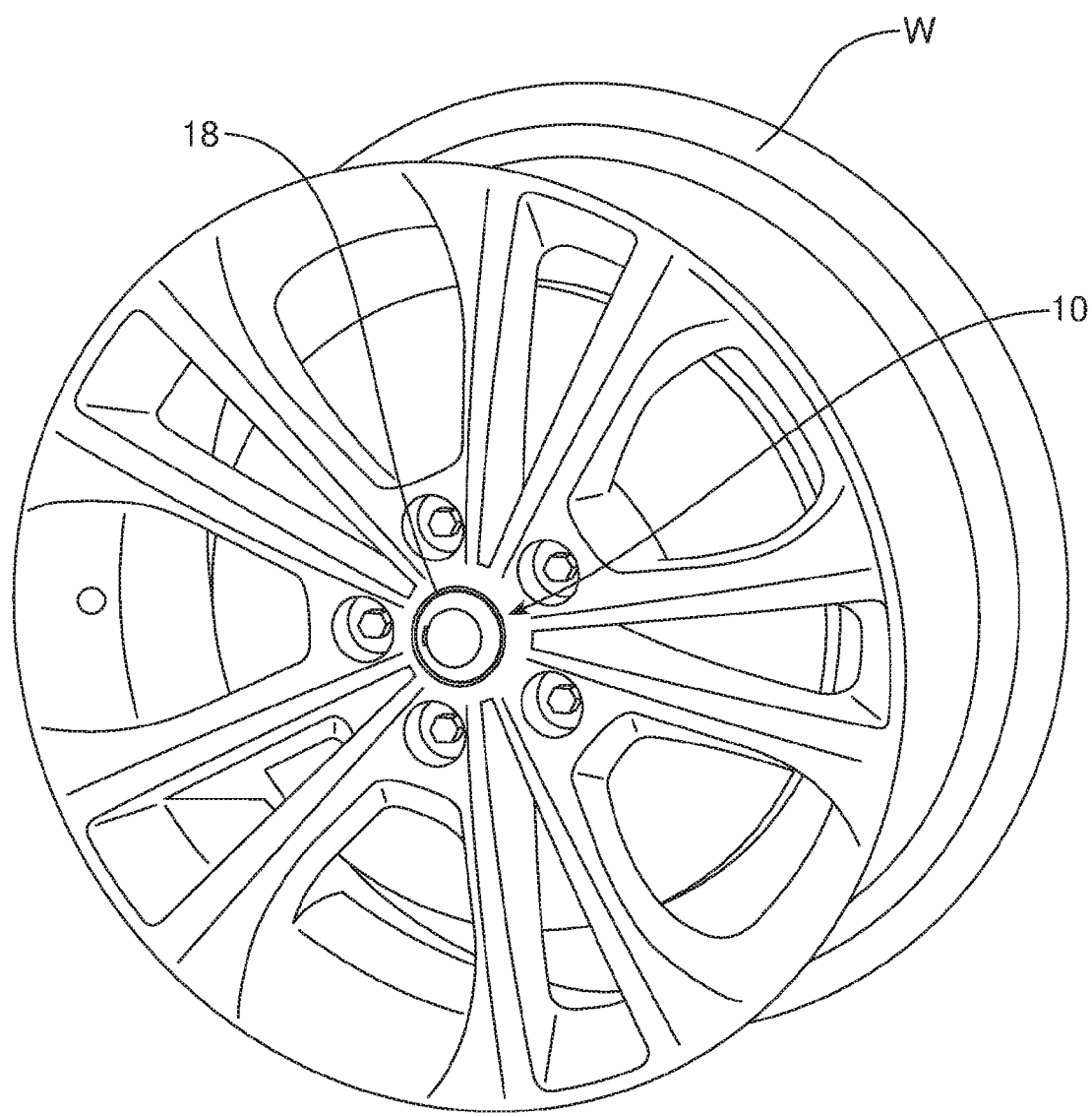
FIG. 6 is a perspective view of a wheel including the wheel locking assembly.

As should be appreciated, the wheel locking assembly 10 is useful in a method of securing a wheel W to a wheel hub H of a motor vehicle (see FIG. 5). That method may be described as including the steps of seating the wheel W on the wheel hub H, positioning the wheel locking assembly 10 over the wheel at the center thereof and deploying the wheel retainer 24 into a wheel locking position as illustrated in FIG. 5. More specifically, the flanges 46 on the ends of the plurality of spring legs 28 engage in a locking channel 48 formed in the wheel hub H. In one possible embodiment that locking channel 48 is a continuous, circular channel.

More specifically, in some embodiments the method may include the step of turning the key K to deploy the wheel retainer 24 and secure the wheel W to the wheel hub H. In one possible embodiment, the key K may be turned through 90 degrees and the key is retained inside the locking cylinder 14 when not in the locked position.

As should be appreciated, the turning of the key K turns the rotary cam 30. As the cam 30 turns, the cam lugs 32 force the plurality of spring legs 28 of the retainer 24 radially outwardly so that the flanges 46 on those legs are brought into full engagement and seat in the bottom of the locking channel 48 when in the locked position. This prevents removal of the wheel W from the wheel hub H. Further, the protective shroud 20 provides added security, guarding against any attempt to cut the spring legs 28 adjacent the base ring 26 with a prying tool. Toward this end, it should be appreciated that the base of the shroud 20 seats against the wheel bearing plate 34 directly inside the raised lip or rim 50.

In contrast, when it is desired to unlock the wheel locking assembly 10, the key K is turned in the opposite direction and the spring legs 28 are biased by resilient memory inwardly back into their home or unlocked position. As a result, the flanges 46 are free of the locking channel 48 and the wheel locking assembly 10 may be removed thereby freeing the wheel W for removal from the hub H.

In summary, the wheel locking assembly 10, provides a number of benefits and advantages. The assembly 10 has the versatility to work with wheel designs with both exposed and covered lug nuts. The wheel locking assembly 10 with the decorative dust cap 18 and protective shroud 20 provides excellent wheel security while also allowing designers a free hand in styling the wheel W. In addition, the matching of the locking cylinder 14 to the ignition/door key K of the motor vehicle limits the number of keys that must be carried and avoids the necessity of having to maintain an extra key for removing the wheels W from the wheel hubs H of the motor vehicle.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A wheel locking assembly for securing a wheel to a wheel hub of a motor vehicle, comprising:

a locking cylinder;

a wheel retainer displaceable by said locking cylinder between an unlocked position, allowing removal of said wheel from said wheel hub, and a locked position securing said wheel to said wheel hub, wherein said wheel retainer includes a plurality of radially arrayed spring legs; and a rotary cam connected to said locking cylinder and engaging said wheel retainer, wherein said rotary cam includes a plurality of lugs corresponding to the plurality of radially arrayed spring legs.

2. The wheel locking assembly of claim 1, further including a dust cap covering a key slot in said locking cylinder.

3. The wheel locking assembly of claim 2, further including a protective shroud concentrically received around said locking cylinder.

4. The wheel locking assembly of claim 3, further including a wheel bearing plate concentrically received around said locking cylinder between said protective shroud and said rotary cam.

5. The wheel locking assembly of claim 4, wherein said wheel bearing plate includes a plurality of apertures and said plurality of radially arrayed spring legs project through said plurality of apertures.

6. The wheel locking assembly of claim 5, further including a spacer concentrically received over said locking cylinder between said wheel bearing plate and said rotary cam.

7. A method of securing a wheel to a wheel hub of a motor vehicle, comprising:

seating said wheel on said wheel hub;

positioning a wheel locking assembly over said wheel at a center of said wheel;

deploying a wheel retainer of said wheel locking assembly into a wheel locking position in engagement with a locking channel on said wheel hub;

providing said wheel retainer with a plurality of radially projecting legs that engage in a continuous channel on said wheel hub when deployed into said wheel locking position; and extending said plurality of radially projecting legs through apertures provided in a wheel bearing plate carried on said wheel locking assembly.

8. The method of claim 7, including turning a key to deploy said wheel retainer and secure said wheel to said wheel hub.

9. The method of claim 8, including turning a rotary cam to deploy said wheel retainer into said wheel locking position.

10. A wheel locking assembly for securing a wheel to a wheel hub of a motor vehicle, comprising:

a locking cylinder;

a dust cap covering a key slot in said locking cylinder;

a protective shroud concentrically received around said locking cylinder;

a wheel retainer displaceable by said locking cylinder between an unlocked position, allowing removal of said wheel from said wheel hub, and a locked position securing said wheel to said wheel hub, wherein said wheel retainer includes a plurality of radially arrayed spring legs;

a rotary cam connected to said locking cylinder and engaging said wheel retainer; and a wheel bearing plate concentrically received around said locking cylinder between said protective shroud and said rotary cam, wherein said wheel bearing plate includes a plurality of apertures and said plurality of radially arrayed spring legs project through said plurality of apertures.

11. The wheel locking assembly of claim 10, further including a spacer concentrically received over said locking cylinder between said wheel bearing plate and said rotary cam.

* * * * *